United States Patent
Tilmann et al.

(10) Patent No.: US 7,902,491 B2
(45) Date of Patent: Mar. 8, 2011

(54) DEVICE FOR REGULATING THE BACKLIGHTING OF AN LC DISPLAY

(75) Inventors: Lorenz Tilmann, Regensburg (DE); Gerhard Mager, Cadolzburg (DE); Bernhard Siegmar, Beucherling (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 358 days.

(21) Appl. No.: 11/794,784

(22) PCT Filed: Nov. 9, 2005

(86) PCT No.: PCT/EP2005/055843
§ 371 (c)(1), (2), (4) Date: Jul. 2, 2007

(87) PCT Pub. No.: WO2006/072495
PCT Pub. Date: Jul. 13, 2006

(65) Prior Publication Data
US 2009/0278032 A1    Nov. 12, 2009

(51) Int. Cl.
*H05B 37/02*    (2006.01)
(52) U.S. Cl. ............ 250/214 AL; 250/221; 250/214.1; 315/149; 315/156; 315/159
(58) Field of Classification Search ............ 250/214 AL, 250/221, 214.1; 315/149, 156, 159
See application file for complete search history.

(56) References Cited

U.S. PATENT DOCUMENTS

| 4,760,389 | A | | 7/1988 | Aoki et al. |
| 5,406,173 | A | | 4/1995 | Mix et al. |
| 5,422,544 | A | | 6/1995 | Giddings et al. |
| 5,490,005 | A | | 2/1996 | Jueliger |
| 5,763,872 | A | * | 6/1998 | Ness ................... 250/214 AL |
| 5,789,868 | A | * | 8/1998 | Sears ................... 315/149 |
| 5,834,765 | A | * | 11/1998 | Ashdown ................... 250/221 |
| 6,275,163 | B1 | | 8/2001 | Bogorad et al. |
| 6,583,573 | B2 | * | 6/2003 | Bierman ................... 250/214 AL |
| 7,280,102 | B2 | * | 10/2007 | Abileah et al. ................... 345/204 |
| 2003/0116153 | A1 | | 6/2003 | Anschutz et al. |
| 2005/0212652 | A1 | | 9/2005 | Ludenia |

FOREIGN PATENT DOCUMENTS

| DE | 41 40 647 A1 | 6/1993 |
| DE | 198 01 065 A1 | 7/1999 |
| DE | 198 16 749 A1 | 10/1999 |
| DE | 199 55 499 A1 | 5/2001 |
| DE | 100 08 072 A1 | 8/2001 |
| DE | 100 31 660 A1 | 1/2002 |
| DE | 102 36 937 A1 | 2/2004 |
| EP | 0 224 869 A1 | 6/1987 |

OTHER PUBLICATIONS

Chinese Office Action dated Apr. 6, 2010.

* cited by examiner

*Primary Examiner* — Seung C Sohn
(74) *Attorney, Agent, or Firm* — Laurence A. Greenberg; Werner H. Stemer; Ralph E. Locher

(57) ABSTRACT

A device for controlling the luminosity of an illuminating device, in particular for LC-display units in household appliances, includes a sensor which is used to detect the presence of a user, and a luminosity sensor. An exchange between two different luminosity values of the illuminating device according to the presence of a user and according to the surrounding luminosity takes place in a continuous manner.

14 Claims, 1 Drawing Sheet

DEVICE FOR REGULATING THE BACKLIGHTING OF AN LC DISPLAY

BACKGROUND OF THE INVENTION

Field of the Invention

The present invention relates to a device for regulating the brightness of an illumination facility, in particular for regulating the backlighting of a display in the form of an LC display unit for domestic appliances.

Backlighting for displays, which is deactivated a certain time after the end of a program and reactivated by operating a button, is known for example from the displays on mobile phones.

In a field removed therefrom, specifically for external illumination, movement sensors are known, which activate a light source when a living being or object, which emits a similar IR (infrared) radiation to a human, approaches. So that this does not also happen in daylight, a brightness sensor is integrated, which deactivates the circuit by day. The switching point, at which the brightness sensor is to activate the external illumination as a function of ambient brightness, has to be set manually by the user.

The backlighting of LCDs (liquid crystal displays) in particular is optimized for use in moderate ambient brightness. Where the ambient brightness is at a low level, these often light up too brightly and dazzle the user.

A further disadvantage of known illumination facilities consists of the fact that the brightness sensors do not take into account the spectral sensitivity of the human eye, for example when the ambient brightness is generated by different light sources. As a result such illumination facilities can appear either too bright or too dark for the observer, depending on the source of the ambient brightness.

SUMMARY OF THE INVENTION

The object of the invention is therefore to provide an illumination facility, in particular as backlighting for displays, which adapts to the ambient brightness in such a manner that the user is not dazzled and the life of the illumination facility is extended, while saving energy at the same time.

According to the invention this object is achieved by a device for regulating the brightness of an illumination facility with a sensor for detecting the presence of a user and a brightness sensor, with which a switch takes place in a continuous manner between two different brightness values of the illumination facility as a function of the presence of a user and as a function of the ambient brightness.

The term "brightness" can be characterized more specifically by the physical variable "light intensity".

The term "continuous" here means that the increase or reduction in the brightness of the illumination facility is made gradually and not suddenly. The brightness is hereby preferably adjusted in a predetermined time interval, for example rising in a linear manner or falling in a linear manner, in a comparable manner to the adjustment of brightness using a dimmer. It can also be done in small steps, which the user still perceives. In any event the user's eye can become used to the changing brightness so that it does not feel dazzled. As well as saving energy and not dazzling the user, this also advantageously extends the life of the illumination facility.

The illumination facility is preferably a backlighting system, for example of an LC display, which is deployed for example in conventional domestic appliances. Examples of such domestic appliances are washing machines, tumble dryers, cookers, dishwashers and refrigeration appliances. The inventive regulation of the illumination facility generally takes place during operation of the appliance. A continuous increase or decrease in the brightness of the illumination facility can however additionally be provided for before or at the time of bringing into service and respectively during or after disconnection of the appliance or a switching of the appliance to standby mode. This means that the user can enjoy the convenience of a dazzle-free display at any time, not just during operation.

The brightness of the backlighting is adjusted to the ambient brightness, so that the user is not dazzled, for example in dark rooms. The presence of the user and the ambient brightness can thereby be detected respectively using one or more sensors. The range of the sensor for detecting a user and respectively the distance from the display a user must be before being detected by the movement sensor, is preferably maximum 4 meters.

The sensor, which identifies the presence of a user in front of the display, preferably a movement sensor, can transmit a corresponding signal, for example to a data processing unit. It ensures that the backlighting of the display is automatically activated in the presence of a user and is deactivated immediately when they leave. When the appliance is switched on, the backlighting can however also remain activated for a certain time. The sensor for detecting the presence of the user can hereby be deactivated for this time. This time can be permanently predefined in the data processing unit or can be set by the user. It can be set in steps or continuously. Such setting can be carried out both by the user and also automatically depending on the requirement of the respective user. A corresponding switch for example can be provided on the appliance for manual setting purposes.

With transflective LCD displays it is also possible to dim the backlighting when there is a high incidence of ambient light or to deactivate it completely from a certain ambient brightness. With other types of display, for example transmissive displays, the backlighting of the display remains largely constant with a high level of ambient brightness but can also be dimmed when there is a low level of ambient brightness.

To ensure the operability of the display even if a sensor is defective, it is possible to activate the illumination facility manually, for example by pressing a button, in the event of failure or error on the part of the sensor(s).

According to the invention the sensor(s) can also activate other facilities of the appliance in addition to the illumination facility. In addition to the backlighting therefore further functions of the appliance can also be activated by the movement sensor as a function of the presence of a user. Depending on the domestic appliance therefore, the illumination of the control elements, drum or oven interior illumination can for example be advantageously switched to standby mode or be switched on or off. In the case of networked domestic appliances it is also conceivable for the displays and/or functions of several or all appliances to be activated by a movement sensor. This can be provided for example in one of the appliances or externally as a separate module. In the latter instance the sensor can be suitable for communicating with a central controller or regulator or the other or all the appliances.

The illumination facility can thereby be regulated irrespective of the type of light source generating the ambient brightness but preferably as a function of the sensitivity of the human eye.

The ambient brightness can be generated by different light sources, for example by sun, fluorescent or halogen lamps, the spectral intensities of which can differ greatly. Since the human eye has a spectral sensitivity, which can be described by a V(λ) curve, a brightness sensor is preferably used, whose signal is independent of the type of light source and takes into account the sensitivity of the human eye. Sensors of this type that can be used are for example photocells or photoresistors, since their spectral sensitivity is very close to that of the human eye and in particular has no sensitivity in the IR range of the light. Photodiodes can also be used as brightness sensors. Since photodiodes are however very sensitive precisely in the wavelength range from 750 nm to 900 nm, in other words beyond the visible range, and therefore lack the sensitivity of the eye in respect of illumination by a light source with a high IR element, photodiodes can advantageously be used with a filter, which absorbs or reflects the IR element of the light.

The signal of the brightness sensor can be read into a controller, which is for example part of a data processing unit. The signal can be converted using an AD converter (analog/digital converter). A stored table, having an assignment between measured voltage values and corresponding percentage values of PWM (pulse-width modulation) activation, can be used to "translate" the signal or measured voltage into the corresponding percentage value of the PWM activation of the backlighting. If the ambient brightness changes, PWM activation does not have to be adjusted suddenly as a result but can be adjusted gradually. The bandwidth of the signal is preferably 0.2 to 10 Hz.

The illumination facility can also be regulated as a function of the respective color of the illumination facility. The percentage activation of the backlighting, for example of an LCD display, is thereby a function of the color of the backlighting. A corresponding table with voltage and percentage values of PWM activation can for example be defined specifically for each display as a function of the respective color of the illumination facility and be filed or stored in the controller/regulator.

The device can also be set up so that a base value for brightness can be set as a function of the eye sensitivity of a user and the maximum brightness of the illumination facility. Since both the sensitivity of the human eye and the illumination means of the backlighting, for example LEDs (light emitting diodes), have tolerances, the user can use software to select a base brightness value, relative to which the backlighting is regulated. This base brightness value can be stored. In the event of an error, the backlighting can be regulated constantly to this base brightness value. The software can for example be stored in the form of a computer program with program code means on one or more data media of the data processing unit.

When regulating the brightness it is also possible to proceed according to a hysteresis loop, so that minor fluctuations in the brightness do not cause the display to flicker.

The invention also relates to a domestic appliance, having one or more inventive devices.

The brightness sensor is preferably disposed close to the display, for example in the control panel of the domestic appliance, or integrated directly in the display. The movement sensor can thereby be oriented so that it detects the direction from which a user is expected to approach. The movement sensor can thereby be oriented to an expected approach direction of a user manually or automatically, for example by means of corresponding adjustment devices. The movement sensor can also be provided in the domestic appliance or as an independent module.

DETAILED DESCRIPTION OF THE INVENTION

In the accompanying figure a diagram shows an example of the dependency of the percentage activation of the backlighting on the ambient brightness for a display. The abscissa here is marked "Ambient brightness" in the unit lux [lx] and the ordinate is marked "Percentage activation of backlighting" in the unit percent [%]. To show the respective percentage activation of the backlighting as a function of ambient brightness more clearly, the curve shown has been divided into four areas I to IV. The areas are separated from each other by a broken line.

Area I for example represents the activation of the backlighting when a user is detected by the presence or movement sensor. The backlighting is not activated suddenly or at once to full brightness here but continuously, rising in a linear manner. The initial value in this instance is a base brightness value for the backlighting that can be preset by the user. Where the backlighting is completely deactivated, when a user is detected, it is also possible to start from zero as the initial value for continuous activation of the backlighting (not shown).

Area II shows backlighting activated with constant brightness with the ambient brightness increasing and a user present.

Area III shows a switch from a high brightness level value to a lower brightness level value for the backlighting. This switch also takes place continuously, in this instance with a percentage activation of the backlighting that decreases in a continuous and linear manner. Such a reduction in the brightness of the backlighting can for example be provided as the ambient brightness increases, since the user then no longer needs such a high brightness value for the backlighting to be able to read the display reliably. Such a reduction can save energy.

The area marked IV shows the deactivation of the backlighting. In this instance too the switch from a specific brightness value to zero does not take place suddenly but continuously, in this instance falling in a linear manner. Deactivation of the backlighting, marked as area IV, can for example take place when, as in this case, the ambient brightness has reached a value, which renders backlighting of the display so that it can be read reliably superfluous or when the absence of a user is signaled by the movement sensor.

It should finally be pointed out once again that the detailed description above relates to an exemplary embodiment, which can be modified by the person skilled in the art in a most diverse manner, without departing from the scope of the invention. In particular specific refinements can have a different form from the one described here. For the sake of completeness, it should also be pointed out that the use of the indefinite article "a" and respectively "an" does not exclude the features in question also being present in a multiple manner.

Figure 1:
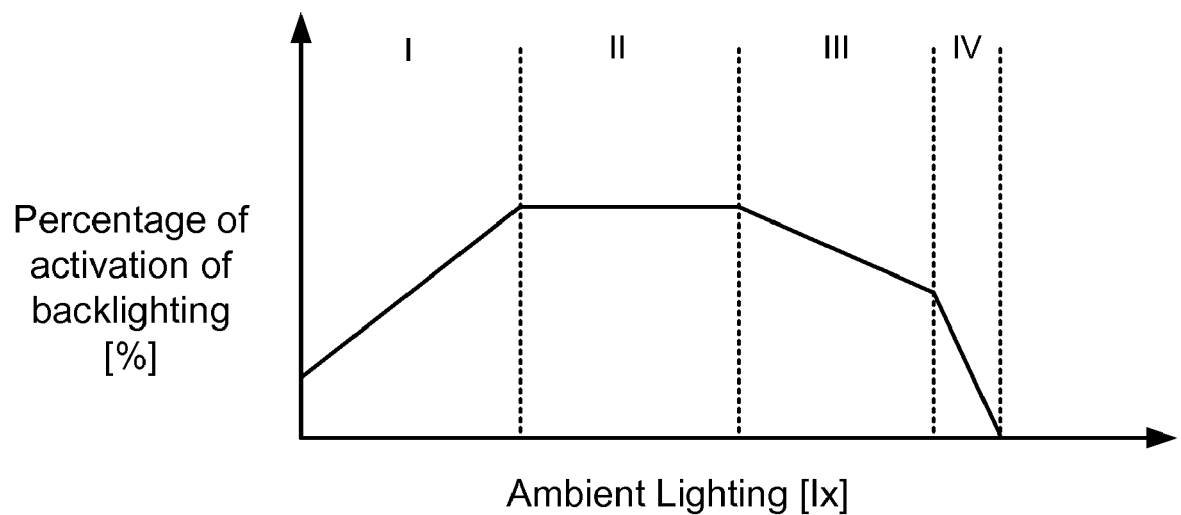
FIG. 1 is a diagram showing the dependency of the activation of the display on the ambient brightness.
Figure 2:
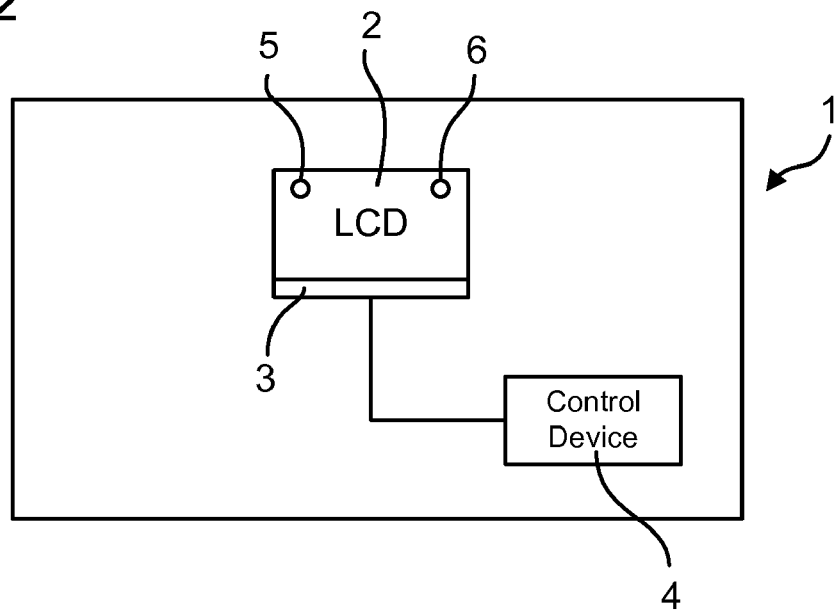
FIG. 2 shows a domestic appliance with an LCD.

FIG. 2 illustrates a domestic appliance 1 with an LC display 2. The display 2 is lit from a backlight 3, which is controlled from a control device 4. A sensor 5 monitors for the presence of an object and a brightness sensor 6 monitors the ambient brightness in a spectral range of the spectral sensitivity of the human eye.

The invention claimed is:

1. A device for regulating the brightness of a backlight of an LC display in a domestic appliance, comprising:
   a sensor for detecting a presence of a user and causing the backlight to be automatically activated on detecting a presence of a user;
   a brightness sensor for detecting an ambient brightness in a spectral range of spectral sensitivity of a human eye;
   wherein a change is effected between two different brightness values of the LC display backlight in dependence on the presence of a user and in dependence on an ambient brightness; and
   wherein the change is effected continuously and the LC display backlight is controlled in dependence on the spectral sensitivity of the human eye.

2. The device according to claim 1, wherein said sensor for detecting the presence of a user or said brightness sensor is one of a plurality of sensors.

3. The device according to claim 1, wherein the device is configured for setting a time, for which the LC display backlight remains activated after a signal from a respective said sensor, in steps or continuously.

4. The device according to claim 1, which comprises a manual activation input for manually activating the LC display backlight in the event of failure or error on the part of said sensor or sensors.

5. The device according to claim 1, wherein at least one of said sensors is integrated in a system for activating further functions of the appliance, in addition to the LC display backlight.

6. The device according to claim 1, wherein the LC display backlight can be regulated independently of a type of light source generating the ambient brightness.

7. The device according to claim 1, wherein the LC display backlight can be regulated in dependence on a respective color of illumination device.

8. The device according to claim 1, wherein a base value for brightness is set as a function of an eye sensitivity of a user and a maximum brightness of the LC display backlight.

9. In combination with a domestic appliance, the device according to claim 1.

10. The device according to claim 1, wherein said brightness sensor is a photocell on a photoresistor having a spectral sensitivity substantially corresponding to the spectral sensitivity of the human eye.

11. The device according to claim 1, wherein said brightness sensor is a photodiode and a filter connected to said photodiode.

12. A device for regulating the brightness of a backlight of an LCD in a domestic appliance, comprising:
   a sensor for detecting a presence of a user and causing the backlight to be automatically activated on detecting a presence of a user;
   a brightness sensor for detecting an ambient brightness in a spectral range of a spectral sensitivity of a human eye;
   a control device connected to receive signals from said sensor and said brightness sensor, said control device being configured to:
   activate the backlight when said sensor detects a presence of a user;
   change a brightness value of the LC display backlight in dependence on the presence of a user and in dependence on an ambient brightness;
   change the brightness value continuously and in dependence on the spectral sensitivity of the human eye; and
   regulate the brightness value in dependence of a respective color of the LC display.

13. The device according to claim 12, wherein said brightness sensor is a photocell or a photoresistor having a spectral sensitivity substantially corresponding to the spectral sensitivity of the human eye.

14. The device according to claim 12, wherein said brightness sensor is a photodiode and a filter connected to said photodiode.

* * * * *